United States Patent [19]

Bird

[11] 4,231,611
[45] Nov. 4, 1980

[54] CYCLE SEAT AND CLAMP THEREFOR

[75] Inventor: Martin J. Bird, Norwalk, Ohio

[73] Assignee: Persons-Majestic Manufacturing Company, Monroeville, Ohio

[21] Appl. No.: 923,059

[22] Filed: Jul. 10, 1978

[51] Int. Cl.³ ............................................. B62J 1/00
[52] U.S. Cl. .................................. 297/195; 248/540; 403/3
[58] Field of Search .............. 297/195, 209; 248/207, 248/225.3, 518, 230, 535, 541; 403/3

[56] References Cited

U.S. PATENT DOCUMENTS

| | | | |
|---|---|---|---|
| 1,015,717 | 1/1912 | Shimer | 248/540 X |
| 1,936,109 | 11/1933 | Frank | 403/3 |
| 3,501,119 | 3/1970 | Rich, Jr. | 297/195 X |
| 3,950,874 | 4/1976 | Diggs | 248/540 X |
| 4,108,462 | 8/1978 | Martin | 297/195 X |

FOREIGN PATENT DOCUMENTS

| | | | |
|---|---|---|---|
| 470887 | 10/1914 | France | 297/195 |
| 1151128 | 1/1958 | France | 297/209 |

*Primary Examiner*—Roy D. Frazier
*Assistant Examiner*—Peter A. Aschenbrenner
*Attorney, Agent, or Firm*—Squire, Sanders & Dempsey

[57] ABSTRACT

A cycle seat clamp for selectively securing a cycle seat having a saddle and a truss to support posts having differing sizes is comprised of a first receptacle for receiving a support post of one size, a second receptacle connected to the first receptacle for receiving a support post of a second size, and a compression member for compressing one of the receptacles against a received support post to secure the cycle seat thereon. Also disclosed is a cycle seat comprising a clamp of the foregoing type.

19 Claims, 6 Drawing Figures

CYCLE SEAT AND CLAMP THEREFOR

BACKGROUND OF THE INVENTION

1. Field of the Invention

The present invention relates, generally, to a cycle seat and a clamp for securing the seat to a support on a cycle. More specifically, the present invention relates to a clamp for selectively securing a cycle seat to support posts having different sizes, and to cycle seats comprising such clamps.

2. Description of the Prior Art

Diverse means are known in the prior art for securing a cycle seat on a support member. A cycle seat (e.g. bicycle seat) is conventionally comprised of a saddle having a clamp which secures the saddle to a generally upstanding support post. Support posts in this context are typically cyclindrical rods having a standard $\frac{5}{8}''$ or $\frac{7}{8}''$ diameter. Consequently, it is necessary to provide a clamp which can adequately accomodate this disparity in standard sizes.

One approach heretofore undertaken in this regard has been the incorporation of a bushing or similar insert within the clamp attached to the saddle member. The inner diameter of the bushing member is $\frac{5}{8}''$, corresponding with the smaller support post; while the diameter of the clamp, which receives the bushing, is $\frac{7}{8}''$ in order to accomodate the larger post. Consequently, when it is desired to mount the saddle on the support post, the bushing may be retained in the clamp should the support be a $\frac{5}{8}''$ post, or may be removed and discarded to expose the larger $\frac{7}{8}''$ diameter of the clamp in the event it is necessary to mount the seat on the larger diameter post.

Another, and more expensive, approach employed to account for differences in the sizes of support posts has been to supply the saddle to customers with two separate clamps. A clamp of one size (e.g. $\frac{5}{8}''$) is mounted on the saddle, while the other (i.e. $\frac{7}{8}''$) is packed loosely therewith. Depending upon the support post employed on the cycle, the appropriate clamp is utilized to secure the saddle thereon and the other clamp is discarded.

Because of the increase in cost by virtue of the foregoing approaches, where parts are discarded, other attempts to design a clamp capable of mounting the seat on different size posts have been proposed. One such proposal is a clamp having a diameter sufficiently large to accomodate the $\frac{7}{8}''$ variety post, but which can be compressed to a degree which allows the clamp to engage a $\frac{5}{8}''$ post. Such a design has not been found to be as structurally sound as is desirable.

Accordingly, the need exists to provide a clamp for a vehicle seat which can adequately accommodate differing diameters of support posts without sacrificing structural integrity.

SUMMARY OF THE INVENTION

In accordance with the aforementioned deficiencies of prior art clamps for vehicle seats, it is a principal object of the present invention to provide a cycle seat and clamp therefor which can accommodate support posts having differing sizes.

Yet another object of the present invention is to provide a simplified cycle seat clamp for receiving support posts of differing diameters, which clamp provides positive and reliable engagement between the saddle and support post members.

A further object of the present invention is to provide a cycle seat clamp of the aforementioned character, which can accommodate either a $\frac{5}{8}''$ or $\frac{7}{8}''$ diameter support post.

Still another object of the present invention is to provide a cycle seat with a clamp for selectively securing the seat to support posts of different sizes.

The foregoing objects may be realized, in accordance with the embodiment of the invention described below, by providing a cycle seat clamp for selectively securing a cycle seat having a saddle and a truss to support posts having differing sizes, which clamp comprises first receptacle means for receiving a support post of one size, second receptacle means connected to the first receptacle means for receiving a support post of a second size, and compressing means for compressing the receptacle means against a received support post to secure the cycle seat thereon. The first and second receptacle means comprise resilient wall members defining first and second apertures configured for receiving support posts of the first and second sizes, respectively. Preferably, the first and second apertures have central axes which are substantially parallel. Each of the receptacles is preferably comprised of an arcuate end wall while the two receptacles are joined by connecting means having side walls comprising continuous extensions of the arcuate end walls.

In a particularly preferred embodiment, the cycle seat truss comprises opposing side plates defining a channel within which the clamp is rotatably secured. To achieve this, it is preferred that the side walls be provided with a first set of serrations on the outer faces thereof for mating with a second set of serrations, preferably formed on a pair of mounting inserts disposed intermediate the side walls and the side plates.

The objects of the invention are further realized by the provision of a cycle seat comprising a clamp of the foregoing type; the seat being mountable on support posts of a plurality of sizes.

Yet other objects and advantages of the present invention will become apparent to the skilled artisan upon examination of the detailed description which follows, taken in conjunction with the figures of drawing, and the appended claims.

DETAILED DESCRIPTION OF THE INVENTION

The present invention relates to a cycle seat and clamp therefor and, along these lines will be described herein with reference to a bicycle seat as a preferred embodiment. However, the skilled artisan will recognize that the scope of the invention is much broader in its applicability to other similar seats and, accordingly, such a description of preferred embodiments is to be deemed illustrative only, and not limitative.

Figure 1:
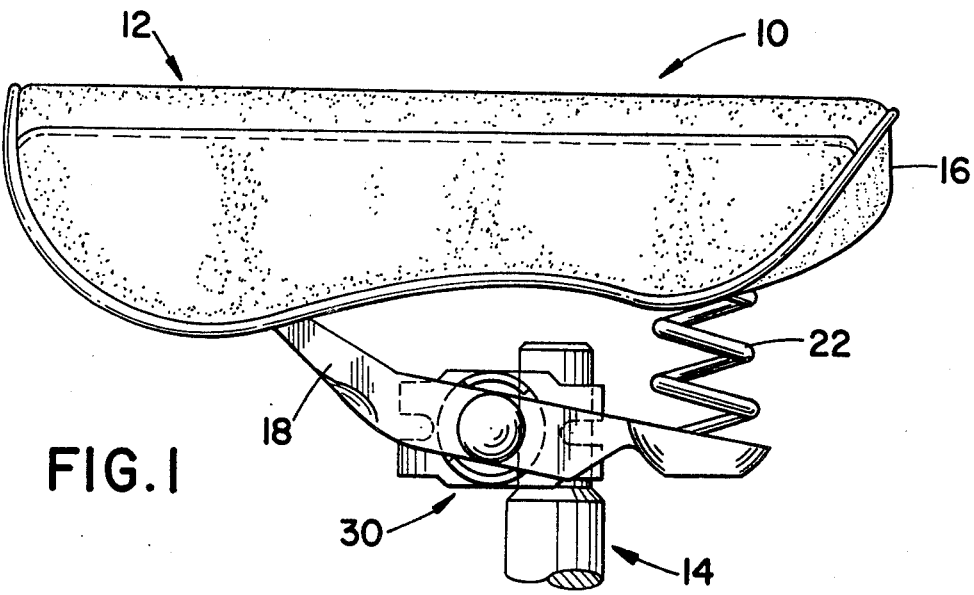
FIG. 1 is a side elevational view of a bicycle seat having a clamp securing the saddle on a support post, according to the present invention.
Figure 2:
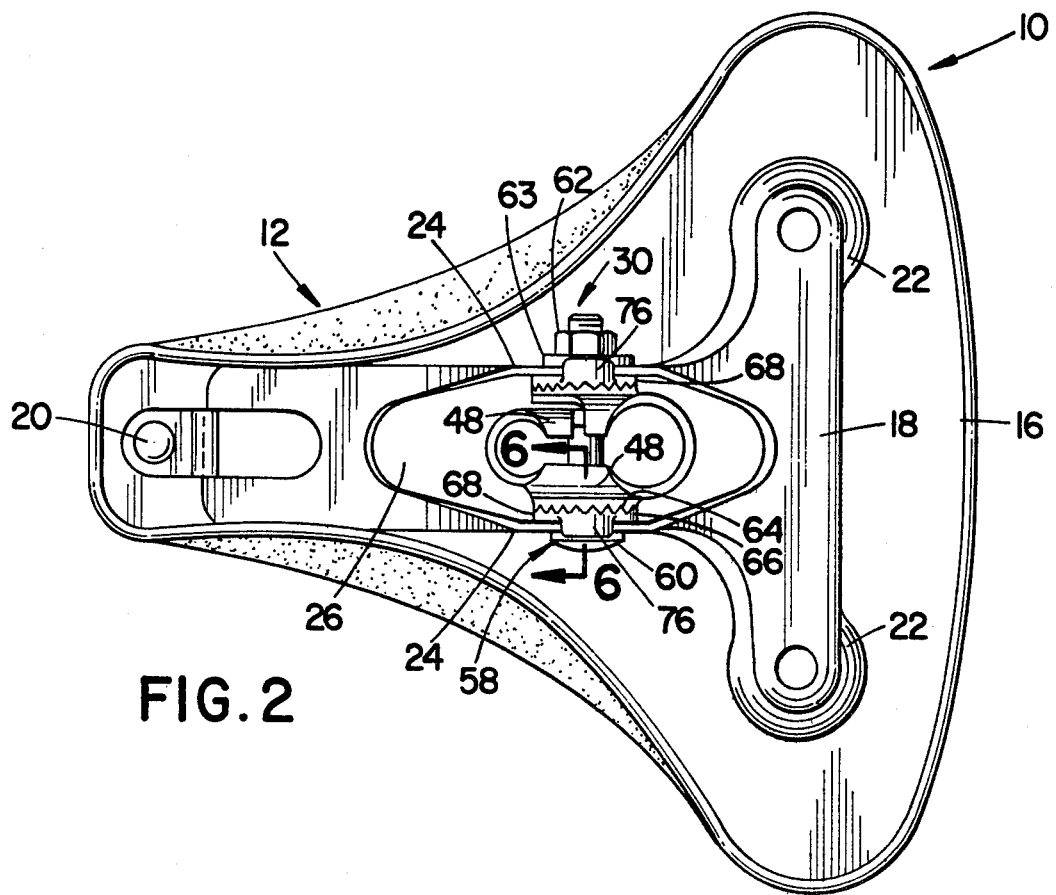
FIG. 2 is a bottom plan view of the saddle shown in FIG. 1.

A bicycle seat assembly, designated generally as 10, is shown to be comprised of a saddle 12 in operative engagement with a generally vertical support post 14 of a bicycle. The saddle 12, itself, is comprised of a seat or cover 16 and a depending truss 18 secured thereto by means of a fastener 20 and a pair of spring members 22. The truss 18 comprises opposing side plates 24 which define a channel 26. A cycle seat clamp assembly, designated generally as 30, is disposed within the channel 26; the assembly 30 being adapted for engagement with upstanding support post 14 in order to positively secure the saddle 12 thereto, as best viewed in FIG. 1.

In the context of conventional American bicycles, the support post 14 will typically be a sheet metal tube having a diameter of either $\frac{5}{8}''$ or $\frac{7}{8}''$. The configuration of support post 14 might be other than circular or have a diameter different from either of the aforementioned. As will become apparent from the description of clamp assembly 30 hereinbelow, the clamp of the present invention is broadly adaptable to accommodate these variations.

Figure 3:
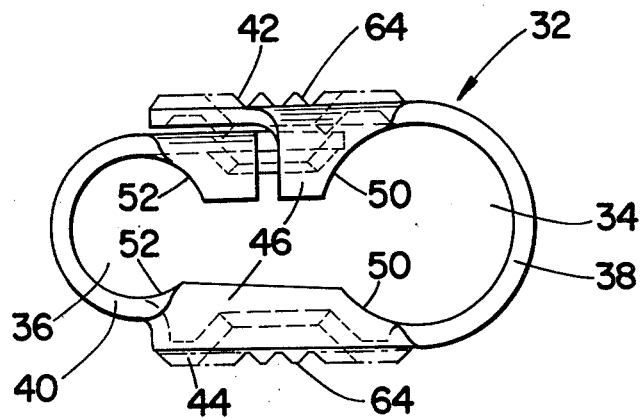
FIG. 3 is a bottom plan view of a cycle seat clamp body of the present invention.
Figure 4:
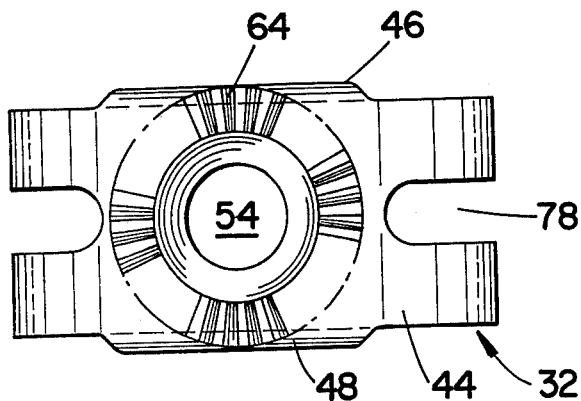
FIG. 4 is a side elevational view of the clamp body of FIG. 3.

Clamp assembly 30 includes a clamp body 32, best viewed in FIGS. 3 and 4, which is comprised of a first receptacle means 34 for receiving a support post of one size, and a second receptacle means 36 for receiving a support post of a second size. In the embodiment illustrated, receptacles 34 and 36 are comprised of arcuate end walls 38 and 40, respectively, with side walls 42 and 44 being provided as essentially continuous extensions thereof in order to join the two receptacles together.

Each of the side walls 42 and 44 is formed with upper and lower inwardly turned lips 46 and 48, respectively. The lips 46 and 48 are generally perpendicular with respect to the side walls 42 and 44; and include arcuate end edges 50 and 52. The edges 50 are configured to correspond with arcuate end wall 38, while the end edges 52 are similarly configured to correspond with arcuate end wall 40. Thus, as best viewed in FIG. 3, wherein the receptacles are generally circular in cross section, the radii of curvature of end wall 38 and end edges 50 will be the same, with a similar correspondence between the end wall 40 and end edges 52. Under most circumstances, it is preferred that the receptacles 34 and 26 be in the form of apertures defined by the walls and inturned lips. Since the saddle 12 will only be secured to a single support post at a given time, it is also preferred that the central axes of each of the receptacle apertures be parallel.

To vary the location of the receptacle to be secured on support post 14, relative to the cycle seat, it is desirable to rotatably mount the clamp body 32 within the channel 26 in truss 18. It is also desirable to be able to adjust the tilt or angular relationship between the seat and the post. To achieve these desirable features, the clamp body 32 is provided with aligned mounting apertures 54 in the side walls 42 and 44; while the side plates 24 of the truss have apertures 56 formed therein which are aligned with apertures 54. An axle member 53 passes through these apertures to permit rotation of the clamp. Advantageously, the axle member 58 is comprised of a threaded bolt 60 and cooperating threaded nut 62. In this manner, the axle can also serve as a means for applying compressive force on the clamp in order to secure the same to the support post.

When clamp body 30 is rotatably mounted within the channel 26, it is advantageous for the clamp to be rotatable in a stepwise manner. Accordingly, each of the side walls 42 and 44 is formed with a first set of serrations 64 on the outer faces thereof. A second set of serrations 66 are formed on the clamp assembly 30 and are configured for mating engagement with the first set to provide the stepwise rotatable feature. By providing these two sets of mating serrations, rotation of the clamp body 32 can be achieved only when the bolt and nut 60 and 62 are loosened sufficiently for the serrations 64 and 66 to disengage. Accordingly, any slight loosening of the nut and bolt during use of the bicycle will not result in free rotation of the clamp, thereby minimizing unwanted rocking of the seat saddle.

Figure 5:
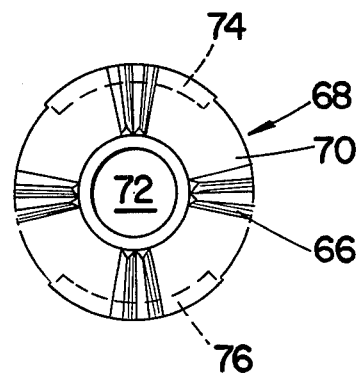
FIG. 5 is a side elevational view of a mounting insert incorporated in the clamp shown in FIGS. 1 and 2; and, FIG. 6 is a detailed, fragmentary, sectional view taken substantially along the line 6—6 of FIG. 2.
Figure 6:
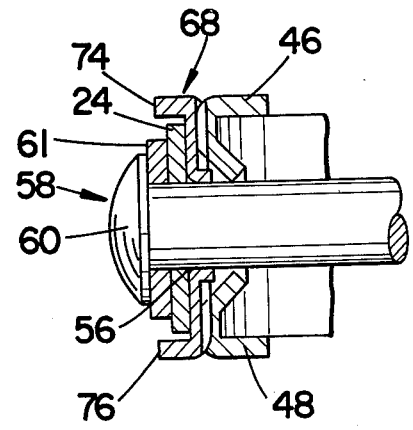

Because it may be inconvenient to form the second set of serrations 66 on the inner faces of side plates 24, a pair of mounting inserts 68 are disposed intermediate the side walls of clamp body 32 and the side plates 24; the second set of mating serrations being formed on these mounting inserts. As best viewed in FIG. 5, the mounting inserts 68 are comprised of a generally circular member 70 bearing the serrations 66. A mounting aperture 72, designed for registration with apertures 54 and 56, is formed in the center of the member 70. Upper and lower outwardly turned lips 74 and 76, respectively, extend generally perpendicularly from the plane of member 70 for engaging the upper and lower edges of side plates 24, as best viewed in FIG. 6.

The clamp of the present invention may be very easily made from a number of suitable materials. For example, the clamp components might be plastic or metal. Similarly, the method of making the clamp might be by molding or die casting, or the main clamp body could be formed from welded tubing or the like. The selection of suitable materials and appropriate methods of manufacture will be dictated by a given application, and may be chosen accordingly.

Once the component parts are made, a pair of mounting inserts 68 may be placed within channel 26 in truss 18 with the lips 74 and 76 in engagement with the upper and lower edges of side plates 24. The clamp body 32 can then be inserted within the channel 26 between the mounting inserts, with the serrations 64 in mating engagement with serrations 66. Bolt 60 with a washer 61 is then inserted through the registering mounting apertures, and nut 62 along with washer 63 can be tightened thereon in order to complete the assembly structure 30. Depending on the size of support post 14, either of the receptacles 34 or 36 can be positioned thereon and the clamp compressed by tightening nut 62 to secure the cycle seat on support post 14.

While the invention has now been described with reference to certain preferred embodiments, the skilled artisan will appreciate that various substitutions, omissions, changes, and modifications may be made without departing from the spirit of the invention. Accordingly, it is intended that the scope of the present invention be limited solely by that of the following claims.

What I claim is:

1. A cycle seat mountable on cycles having support posts of differing sizes, said cycle seat comprising:
   a saddle having an upper portion and a lower portion;
   a truss attached to the lower portion of said saddle; and,
   a clamp rotatably attached to said truss at a pivot point for mounting the seat on a cycle support post, said clamp comprising a plurality of receptacles for respectively receiving the support posts of differing sizes, wherein said receptacles are spaced generally equi-angularly about said pivot point.

2. A cycle seat according to claim 1 wherein said clamp further comprises means for compressing said receptacles against a received support post to clamp the cycle seat firmly on the post.

3. A cycle seat according to claim 2 wherein said receptacles comprise wall means defining first and second apertures of first and second sizes having parallel central axes, for selectively receiving support posts of corresponding first and second sizes.

4. A cycle seat according to claim 3 wherein said truss includes a pair of generally spaced side plates defining a central channel, and means for locating said clamp within said channel.

5. A cycle seat according to claim 4 wherein said side plates of said truss define a first set of bolt receiving apertures; and the axes of said first and second apertures of said clamp are generally parallel with the support post; and said clamp further includes wall means between said first and second apertures defining a second set of aligned bolt receiving apertures having coincident axes generally perpendicular to the axes of said first and second apertures; and said means for locating said clamp within said channel comprises a bolt extending through said first and second sets of bolt receiving apertures.

6. A cycle seat according to claim 5 wherein said bolt is threaded, and said means for compressing said receptacles against a received support post comprises a nut to be screwed on said bolt for compressing said clamp wall means against the received wall post.

7. A cycle seat clamp for selectively securing a cycle seat having a saddle and truss, to support posts having differing sizes, said clamp comprising:
first receptacle means for receiving a support post of one size;
second receptacle means connected to said first receptacle means for receiving a support post of a second size; and,
compressing means for compressing said receptacle means against a received support post to secure the cycle seat on the support post, said compressing means further comprising pivot means attachable to a truss to rotatably vary the position of the receptacle means therewith;
wherein said first and second receptacle means are spaced generally equi-angularly about said compressing means.

8. The clamp of claim 7 wherein said first and second receptacle means comprise resilient wall members defining first and second apertures configured for receiving support posts of the first and second sizes, respectively.

9. The clamp of claim 8 wherein said first and second apertures have substantially parallel axes.

10. The clamp of claim 7 wherein said mounting means includes stepwise rotatable mounting means.

11. The clamp of claim 9 wherein:
each of said receptacles comprises an arcuate end wall; and,
said clamp further includes connecting means having side walls comprising continuous extensions of said arcuate end walls.

12. The clamp of claim 11 wherein said connecting means further comprises inwardly turned lips extending generally perpendicularly from said side walls intermediate said first and second apertures, said lips having first and second arcuate end edges with configurations corresponding to configurations of said first and second apertures.

13. The clamp of claim 12 wherein the cycle seat truss comprises opposing side plates defining a channel and said clamp is rotatably secured within the channel.

14. The clamp of claim 13, further comprising:
first set of serrations on the outer faces of each of said side walls; and,
a second set of serrations on said clamp configured for mating engagement with said first set;
said clamp being rotatable within said channel in a stepwise manner.

15. The clamp of claim 14 further comprising mounting apertures in each of said side walls and said side plates, said mounting apertures being in registration for receiving axle means for rotatably supporting said seat.

16. The clamp of claim 14 wherein said clamp further comprises a pair of mounting inserts each disposed intermediate said side walls and said side plates, said second set of serrations being formed on said pair of mounting inserts.

17. The clamp of claim 16 wherein said clamp further includes axle means for rotatably supporting said seat, and said mounting inserts each comprising:
a member bearing said serrations on one side thereof;
a central aperture for receiving said axle means; and,
outwardly turned lips for engaging edges of said side plates to maintain said inserts in place relative to said side plates.

18. The clamp of claim 17 wherein said axle means comprises a threaded bolt and cooperating threaded nut.

19. The cycle seat of claim 8 wherein the internal diameter of said first aperture is about $\frac{5}{8}''$ and the internal diameter of said second aperture is about $\frac{7}{8}''$.

* * * * *